US011550556B1

(12) United States Patent
Bettin et al.

(10) Patent No.: US 11,550,556 B1
(45) Date of Patent: Jan. 10, 2023

(54) EFFICIENT SEMANTIC ANALYSIS OF PROGRAM CODE

(71) Applicant: SAP SE, Walldorf (DE)

(72) Inventors: Julius Bettin, Walldorf (DE); Kilian Kilger, Walldorf (DE); Christian Stork, Hamm (DE)

(73) Assignee: SAP SE, Walldorf (DE)

( * ) Notice: Subject to any disclaimer, the term of this patent is extended or adjusted under 35 U.S.C. 154(b) by 30 days.

(21) Appl. No.: 17/385,153

(22) Filed: Jul. 26, 2021

(51) Int. Cl.
*G06F 8/41* (2018.01)
*G06F 16/242* (2019.01)

(52) U.S. Cl.
CPC .......... *G06F 8/436* (2013.01); *G06F 16/2433* (2019.01)

(58) Field of Classification Search
CPC ................ G06F 8/41–437; G06F 16/2433
USPC .................................. 717/140–148
See application file for complete search history.

(56) References Cited

U.S. PATENT DOCUMENTS

| 2003/0126590 | A1* | 7/2003 | Burrows | G06F 8/437 |
| | | | | 712/E9.036 |
| 2014/0189526 | A1* | 7/2014 | Chen | G06F 16/2358 |
| | | | | 715/745 |

FOREIGN PATENT DOCUMENTS

| GB | 2503590 A | * | 1/2014 | | G06F 8/41 |

OTHER PUBLICATIONS

Gould, Carl, et al., Static Checking of Dynamically Generated Queries in Database Applications, ICSE '04: Proceedings of the 26th International Conference on Software Engineering, May 2004, pp. 645-654, [retrieved on Oct. 18, 2022], Retrieved from the Internet: <URL:http://dl.acm.org/>.*
Annamaa, Aivar, et al., An Interactive Tool for Analyzing Embedded SQL Queries, In Proc. of the 8th Asian Conf. on Prog. Languages and Systems (APLAS2010), Springer-Verlag, 2010, 131-138, [retrieved on Oct. 18, 2022], Retrieved from the Internet: <URL:https://www.researchgate.net/>.*

* cited by examiner

*Primary Examiner* — Geoffrey R St Leger
(74) *Attorney, Agent, or Firm* — Buckley, Maschoff & Talwalkar LLC

(57) ABSTRACT

Provided are systems and methods of a compiler that efficiently processes semantic analysis. For example, the compiler may perform semantic analysis on as much of the source code as possible during compile time. For any instructions, such as dynamic expressions, that are not known at compile time, the compiler may encode semantic bytecode for performing the semantic checks on such dynamic expressions, and their dependent expressions, during execution/runtime of the program. In one example, the method may include compiling source code of a program into bytecode, identifying, during the compiling, a dynamic expression that includes one or more dependent static expressions within the source code, generating semantic bytecode for semantic analysis of the one or more dependent static expressions of the dynamic expression, and adding the semantic bytecode to the bytecode of the program.

20 Claims, 12 Drawing Sheets

```
                    Source Code                          200

. . .
  . . .
  . . .

DATA tablename   TYPE string.

DATA result    TYPE STANDARD TABLE OF spfli.

Cl_demo_input => request (CHANGING field = tablename).
  // Let the user specify the table              ⌐ 202

SELECT *       ⌐ 204
      FROM (tablename)
                              ⌐ 206
      WHERE cityfrom = 'Los Angeles'

INTO CORRESPONDING FIELDS OF TABLE @result

Combined Semantic Bytecode 540

...
...
ENSURE spfli EXISTS — 542
ENSURE cityfrom EXISTS IN ANY TABLE — 544
ENSURE cityfrom HAS TYPE string — 546
INCLUDE SELECT LIST my_select_list — 548
...
...

Source Code 530

...
...
SELECT (my_select_list) — 532
FROM spfli — 534
WHERE cityfrom = 'Berlin'. — 536
...
...

FIG. 5D

Source Code 570

SELECT firstname 572
FROM (my_from_clause) 574
WHERE 3 + 4 = 7. 576

Combined Semantic Bytecode 580

INCLUDE FROM CLAUSE my_from_clause 582
ENSURE 3 AND 4 HAVE COMPATIBLE TYPES 584
ENSURE 3+4 AND 7 HAVE COMPATIBLE TYPES 586
ENSURE firstname EXISTS IN ANY TABLE 588

503

EFFICIENT SEMANTIC ANALYSIS OF PROGRAM CODE

BACKGROUND

During a software development process, a developer writes source code in a programming language (e.g., Java, ABAP, C++, etc.) that is easy for a human to read and understand. During testing, however, the source code may be complied by a compiler into a format that can be interpreted by a computer such as bytecode. The compiler may perform various checks/analysis on the source code to ensure that the source code will execute properly when the compiled code is executed during runtime. For example, the compiler may perform a lexical analysis, syntactical analysis, and semantical analysis.

The lexical and the syntactical analysis are able to be cleanly separated between compile time and execution time. However, the semantical analysis becomes difficult in the presence of dynamic query parts such as dynamic expressions. The dynamic expressions are typically filled-in at runtime (after compile time) during the program's execution. This prevents the semantical analysis from being performed on the dynamic expressions at compile time. Instead, the compiler must be launched again at runtime to perform the checks.

BRIEF DESCRIPTION OF THE DRAWINGS

Features and advantages of the example embodiments, and the manner in which the same are accomplished, will become more readily apparent with reference to the following detailed description while taken in conjunction with the accompanying drawings.

FIG. 2 is a diagram illustrating an example of dependencies within source code, in accordance with an example embodiment.

FIGS. 5B-5D are diagrams illustrating processes of generating semantic bytecode encoded with semantic checks, in accordance with example embodiments.

Figure 1:
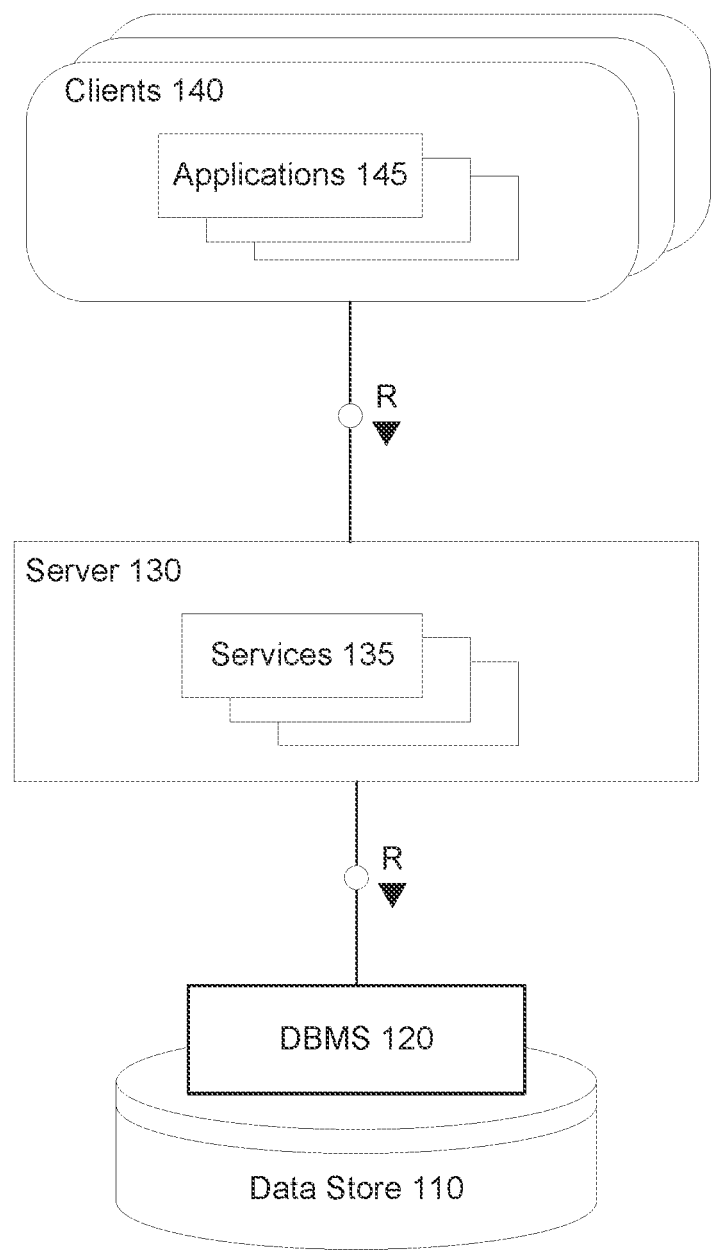
FIG. 1 is a diagram illustrating a database system architecture, in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

When accessing a database using queries such as structured query language (SQL) queries, or the like, most programming languages require the use of an external library such as Java Database Connectivity (JDBC) required by the Java programming language. As another example, in the Advanced Business Application Programming (ABAP) programming language, the SQL capabilities are built into the code language itself, integrating with the type system; a set of rules and constraints assigning types to the various constructs in a programming language. This allows for certain aspects of an SQL query to be checked and validated statically at compile time by a compiler (e.g., ABAP SQL compiler, etc.)

There are often instances where statements or expressions within the source code include variables (e.g., parameters, identifiers, etc.) that are not known at compile time. These statements are referred to herein as "dynamic" expressions (or dynamic clauses) because they include variables that are not known at compile time and only identified at execution time/runtime. Meanwhile, an expression that includes such a variable is referred to as a dynamic expression. For example, a variable that is dynamically filled may be "money" while a dynamic expression may be ("money>100"). As another example, a variable (table) that is dynamically filled in at runtime may be "my_select_list" while a dynamic clause may be SELECT (my_select_list). There could be many reasons for dynamic expressions and dynamic clauses. Some non-limiting examples include a test environment in which an application can access the same data from two different tables (test versus productive). In this case, which table to access may not be provided until runtime by a user input on the screen or a flag added by the database when the query is executed. As another example, when an OData application needs to transform an OData string into an SQL query, the OData application may not know the string until runtime, when the user enters their credentials into the username/password fields on the screen.

In order to support scenarios where parts of a query might not yet be known at compile time, parts of a query may be specified dynamically in the form of a string or character-like variable, causing them to be evaluated at runtime. The presence of dynamic parts in a query has some implications for the way that checks and validations are performed by a compiler. Traditionally, the checks performed by the compiler can be broken down into three phases including lexical analysis which includes converting the source code text into a sequence of tokens, syntactical analysis which includes parsing a statement of source code and converting the source code statement into a sequence of tokens into an (abstract) syntax tree, and semantical analysis which includes analyzing the semantics of the source code, including type checking of tables and variables. The semantical analysis is typically performed on the abstract syntax tree created during the syntactical analysis of the source code.

While the lexical and syntactical analysis of a query can be cleanly separated into compile time and runtime, the semantical analysis becomes troublesome in the presence of dynamic query parts, as other parts might semantically depend on them. Furthermore, there is a difference between statically typed and dynamically typed languages. In a statically typed language like ABAP or Java, the process of semantic analysis such as type checking, i.e. verifying and enforcing the constraints of types, is often performed at compile time whereas in dynamically typed languages like Python or JavaScript this is done at runtime. Here, the compiler gathers and verifies the semantic information of the program. This may include type checking to verify that any constraints imposed by the types used throughout the program are not violated, checking that a specified table exists, checking that a specified column exists in a specified table, etc.

Dynamic query parts are often found in SQL queries, thus, there are often times when the compiler does not know what is being queried at compile time. For example, a different data sources may be possible, with one being selected at runtime. As another example, different modes associated with different environments may be possible, with a mode being selected at runtime, etc. For an SQL query, a column name to query may be known (e.g., salary field, etc.), but a table name where the column is to accessed from may not be known (e.g., column="?"). In this case, even though the compiler knows the column name (i.e., salary) during compile time, but various semantic checks (type checking, table checking, etc.) on the column that require the understanding of the table name cannot be performed during compile time because the parent expression (i.e., the table name) from where the column is to be accessed is not known. Because of this, current approaches perform large parts if not all of the semantic analysis at runtime, which has a negative impact on the performance of the program.

Ideally, it would be efficient to check the entire source code at runtime. However, with dynamic clauses this is simply not an option. The example embodiments overcome some of the drawback mentioned above by the compiler process described herein. Rather than directly perform all of the semantic analysis at runtime or all of the semantic analysis at compile time, the compiler can perform semantic analysis for all expressions that do not rely on dynamic expressions at compile time. Meanwhile, for dependent expressions that depend from dynamic expressions, the compiler may delay the semantic checks of the dependent static expressions until runtime.

Furthermore, to efficiently perform the checks at runtime, the compiler may identify the semantic checks to be performed for the expressions and encode the semantic checks into a bytecode format (semantic bytecode) during compile time. Then, the actual semantic analysis is performed by interpreting the semantic bytecode in a symbolic-execution-based manner during runtime. Instructions of the semantic bytecode determined as depending on runtime information are collected and executed at runtime, combined with the semantic bytecode of the dynamic parts of the query.

Some of the benefits of the efficient compiling process described herein include reducing the number of semantic checks performed at runtime by delaying semantic checks on static expressions of code that depend from dynamic expressions while performing as many semantic checks on remaining static expressions as desired, thereby avoiding costly iterations over the abstract syntax tree representation of the program during runtime. This results in increased (faster) runtime performance of the program in comparison to a traditional compiler process performing all of the semantic analysis during runtime. Furthermore, the semantic checks encoded into the intermediate code can be used to perform checks on the static expressions that are dependent from dynamic expressions thereby preventing any potential errors or conflicts that can result at runtime when the unknown variables of the dynamic expressions are finally filled-in at runtime.

In some of the examples herein an ABAP compiler is described, but it should be appreciated that the example embodiments may be applied to any programming language and its compiler such as Java, or the like. Also, some of the examples herein refer to a specific type of query such as SQL, but it should be appreciated that the example embodiments can be applied anywhere that a compiler works on software that has reverse dependencies and not just SQL or queries in general.

FIG. 1 illustrates a system architecture of a database 100 in accordance with an example embodiment. It should be appreciated that the embodiments are not limited to database 100 or to a database architecture, however, FIG. 1 is shown for purposes of example. Referring to FIG. 1, the database 100 includes a data store 110, a database management system (DBMS) 120, a server 130, services 135, clients 140 and applications 145. Generally, services 135 executing within server 130 receive requests from applications 145 executing on clients 140 and provides results to applications 145 based on data stored within data store 110. For example, server 130 may execute and provide services 135 to applications 145. Services 135 may comprise server-side executable program code (e.g., compiled code, scripts, etc.) which provide functionality to applications 145 by providing user interfaces to clients 140, receiving requests from applications 145 (e.g., drag-and-drop operations), retrieving data from data store 110 based on the requests, processing the data received from data store 110, and providing the processed data to applications 145.

In one non-limiting example, a client 140 may execute an application 145 to perform visual analysis of analytical data or chart-based data causing 3D object data to be output to a user interface on a display of the client 140 which allows the user to view information such as charts, graphs, tables, and the like, based on the underlying data stored in the data store 110. The application 145 may pass analytic information based on the input to one of services 135. A structured query language (SQL) script may be generated based on the request and forwarded to DBMS 120. DBMS 120 may execute the SQL script to return a result set based on data of data store 110, and the application 145 creates a report/visualization based on the result set. As another example, the analytic data may be input by the user and provided directly from the application 145 to the DBMS 120 or the data store 110. According to various embodiments, an application 145 may include the logical components to perform the data merge and conflict resolution steps/processes described herein.

The services 135 executing on server 130 may communicate with DBMS 120 using database management interfaces such as, but not limited to, Open Database Connectivity (ODBC) and Java Database Connectivity (JDBC) interfaces. These types of services 135 may use SQL to manage and query data stored in data store 110. The DBMS 120 serves requests to query, retrieve, create, modify (update), and/or delete data from database files stored in data store 110, and also performs administrative and management functions. Such functions may include snapshot and backup management, indexing, optimization, garbage collection, and/or any other database functions that are or become known.

Server 130 may be separated from or closely integrated with DBMS 120. The server 130 may enable execution of services 135 completely on the database platform, without the need for an additional server. For example, server 130 may provide a comprehensive set of embedded services which provide end-to-end support for Web-based applications. The services 135 may include a lightweight web server, configurable support for Open Data Protocol, server-side JavaScript execution and access to SQL and SQLScript. Server 130 may provide application services (e.g., via functional libraries) using services 135 that manage and query the database files stored in the data store 110. The application services can be used to expose the database data model, with its tables, views and database procedures, to clients 140. In addition to exposing the data model, server 130 may host system services such as a search service.

Data store 110 may comprise any query-responsive data source or sources that are or become known, including but not limited to a SQL relational database management system. Data store 110 may include or otherwise be associated with a relational database, a multi-dimensional database, an Extensible Markup Language (XML) document, or any other data storage system storing structured and/or unstructured data. The data of data store 110 may be distributed among several relational databases, dimensional databases, and/or other data sources. Embodiments are not limited to any number or types of data sources. In some embodiments, the data of data store 110 may include files having one or more of conventional tabular data, row-based data, column-based data, object-based data, and the like. Moreover, the data may be indexed and/or selectively replicated in an index to allow fast searching and retrieval thereof. Data store 110 may support multi-tenancy to separately support multiple unrelated clients by providing multiple logical database systems which are programmatically isolated from one another. Furthermore, data store 110 may support multiple users that are associated with the same client and that share access to common database files stored in the data store 110.

The database 100 may include metadata defining objects which are mapped to logical entities of data store 110. The metadata may be stored in data store 110 and/or a separate repository (not shown). The metadata may include information regarding dimension names (e.g., country, year, product, etc.), dimension hierarchies (e.g., country, state, city, etc.), measure names (e.g., profit, units, sales, etc.) and any other suitable metadata. According to some embodiments, the metadata includes information associating users, queries, query patterns and visualizations. The information may be collected during operation of system and may be used to determine a visualization to present in response to a received query, and based on the query and the user from whom the query was received.

Each of clients 140 may include one or more devices executing program code of an application 145 for presenting user interfaces to allow interaction with the server 130. The user interfaces of applications 145 may comprise user interfaces suited for reporting, data analysis, and/or any other functions based on the data of data store 110. Presentation of a user interface as described herein may include any degree or type of rendering, depending on the type of user interface code generated by server 130. For example, a client 140 may execute a Web Browser to request and receive a Web page (e.g., in HTML format) from the server 130 via HTTP, HTTPS, and/or Web Socket, and may render and present the Web page according to known protocols.

One or more of clients 140 may also or alternatively present user interfaces by executing a standalone executable file (e.g., an .exe file) or code (e.g., a JAVA applet) within a virtual machine. Clients 140 may execute applications 145 which perform operations on the underlying data files stored in data store 110. In the example embodiments, the server 130 may be an application server that is accessed by a client 140 for developing and running a software program. Furthermore, clients 140 may execute compilers that perform the methods and processes described herein to more efficiently perform semantic analysis. For example, a client 140 may implement the efficient semantic analysis methods and systems described herein with respect to FIGS. 2, 3, 4A-4C, 5A, 5B, 6, and 7, and the corresponding descriptions thereof.

FIG. 2 illustrates an example of source code 200 that includes a query with a static expression that is dependent on a dynamic expression in accordance with an example embodiment. Referring to FIG. 2, the source code 200 includes declarations of variables including types, as well as an SQL query that begins with a SELECT statement. To account for the fact that the SQL query might depend on data available only at runtime and thus cannot be completely specified statically, the programming language may allow the programmer to provide certain parts of the query in a dynamic way, so called dynamic clauses.

In this example, the SQL query includes a static expression 206 that is dependent from a dynamic expression 204 (or dynamic clause). The static expression 206 includes an identifier 'cityfrom' which represents a column name or field name of a table to be accessed. Meanwhile, the dynamic expression 204 includes a dynamic variable (tablename) that will be filled in with an actual table name at runtime. In this case, the variables of the static expression 206 are all known at runtime. However, the table from where the column is to be accessed is unknown. Therefore, semantic checks such as is this column present in this table, cannot be performed at compile time.

The compiler may identify the dynamicity of the dynamic expression 204 based on special syntax associated with an instruction 202 within the code where the clause in question is wrapped inside parenthesis which identifies that the variable tablename as being part of a dynamic expression. As another example, the compiler may identify the dynamic variable from a scope of the compiler, or the like.

The interior of the dynamic expression (e.g., inside of the parenthesis) may be interpreted as a dynamic clause; this can either by a direct string- or character-literal, or, as is the case here, an ABAP variable of string-like or character-like type. It is possible to reference ABAP variables in an ABAP SQL statement without using dynamic clauses, although only in very restricted places. For example, a select statement may include the following code:

DATA my_city TYPE string.
my_city='Los Angeles'
SELECT COUNT(*)
FROM spfli
WHERE cityfrom=@my_city.

Here the ABAP variable "my_city" is used in a condition in an ABAP SQL statement. In newer versions of ABAP SQL the usage of an ABAP variable has to be prefixed by the "@" character to set it apart from potentially existing columns with the same name. Again, this is only possible in such places where it does not cause the semantic analysis to become undecidable at compile-time. In this example, the type of the column "cityfrom", as well as the variable "my_city" are already known at compile-time, and is fine. The concept of the underlying database this is mapped to is called "placeholders". If more dynamicness is needed however, the developer should use dynamic clauses.

Referring again to the select statement shown in FIG. 2, the dependency in this case creates a situation in which a statically-defined expression within the source code "WHERE cityfrom='Los Angeles'" is dependent on a dynamically-defined expression within the source code "FROM(tablename)" where the variable tablename is dynamically filled-in at runtime. In this case, the compiler according to various embodiments can identify the dynamic expression and the static expression that is dependent on the dynamic expression, and create semantic code (e.g., bytecode) for performing semantic checks on the static expression at runtime. The semantic bytecode can be encoded within the compiled result of the source code 200 or it may be added to a separate file that is executable on its own.

A significant number of queries depend on information not yet known at compile time and thus contain dynamic clauses to allow for more flexibility. However, this flexibility comes at a cost because additional checks, including additional semantic analysis, must be performed at runtime which can result in a negative impact on performance. The example embodiments introduce a bytecode-based semantic analysis that can be performed at compile time based on semantic bytecode that is encoded by the compiler during compile time. That is, the compiler can perform as many semantic checks as possible during compile time. But for static expressions that depend from dynamic expressions, these checks can be delayed until runtime.

The compiler may detect these dependent static expressions within the source code and encode various checks (semantic checks) into bytecode during compile time that can be processed with the compiled code during runtime. For example, the compiler may have access to a list of possible semantic instructions that can be added to the bytecode. The semantic instructions may include templates that can be filled-in with corresponding variables of the source code that is being compiled at the time. According to various embodiments, the bytecode-based semantic analysis may reduce the runtime performance impact of dynamic clauses by performing as many checks as possible at compile time and delaying checks on dynamic data until runtime when such data becomes available.

Figure 3:
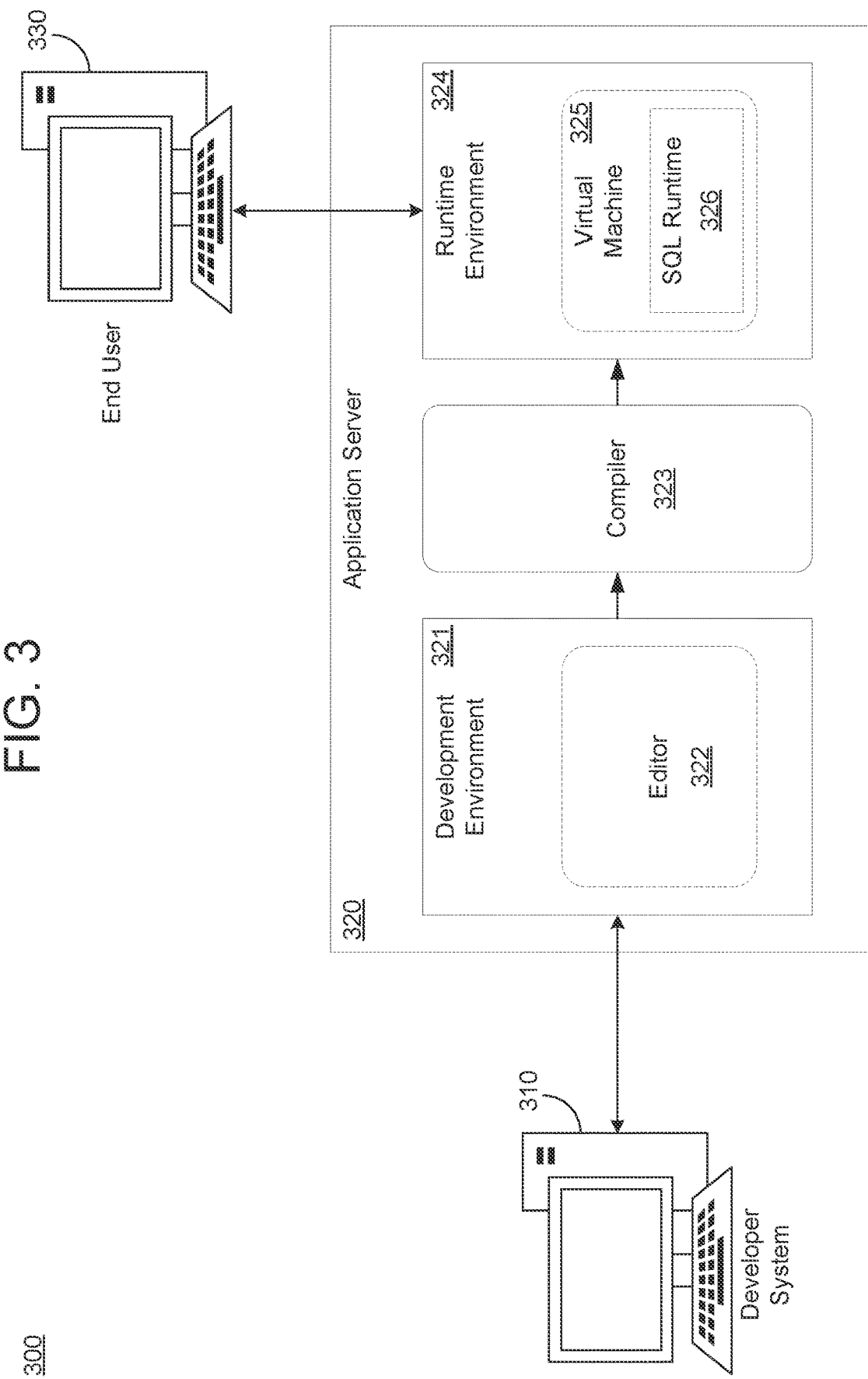
FIG. 3 is a diagram illustrating an execution environment of an application server, in accordance with an example embodiment.

FIG. 3 illustrates an execution environment 300 for an application server 320 in accordance with an example embodiment. Referring to FIG. 3, a developer system 310 (e.g., a computer, a workstation, a server, a database, etc.) may be used to create or otherwise develop a software program such as an application, a service, a plug-in, etc. The developer system 310 may access a development environment 321 on the application server 320 via the internet or other network connection. Here, the developer system 310 may write code within a code editor application 322 or some other coding environment such as an integrated development environment (IDE) or the like. Although not shown in FIG. 3, it should be appreciated that the application server 320 includes underlying storage and network capabilities for interfacing with both the developer system 310 and a database which can be queried at runtime.

At some point, the developer system 310 may request the application server 320 to compile the software program being developed within the code editor application 322. In response, the application server 320 may trigger a compiler 323 to compile the program developed within the development environment 321 into an intermediate representation such as bytecode for ABAP and Java, or the like. The compiler 323 may store the compiled result within an executable file that can be launched within the runtime environment 324. Here, the application server 320 may execute/run the compiled program within the runtime environment 324 which includes a virtual machine 325 for interpreting the compiled code, and an SQL runtime 326 for interpreting the SQL instructions. Furthermore, an end user system 330 may interact with the live/operating program within the runtime environment 324 on the application server 320 via a user interface output from the application server 320.

Figure 4A:
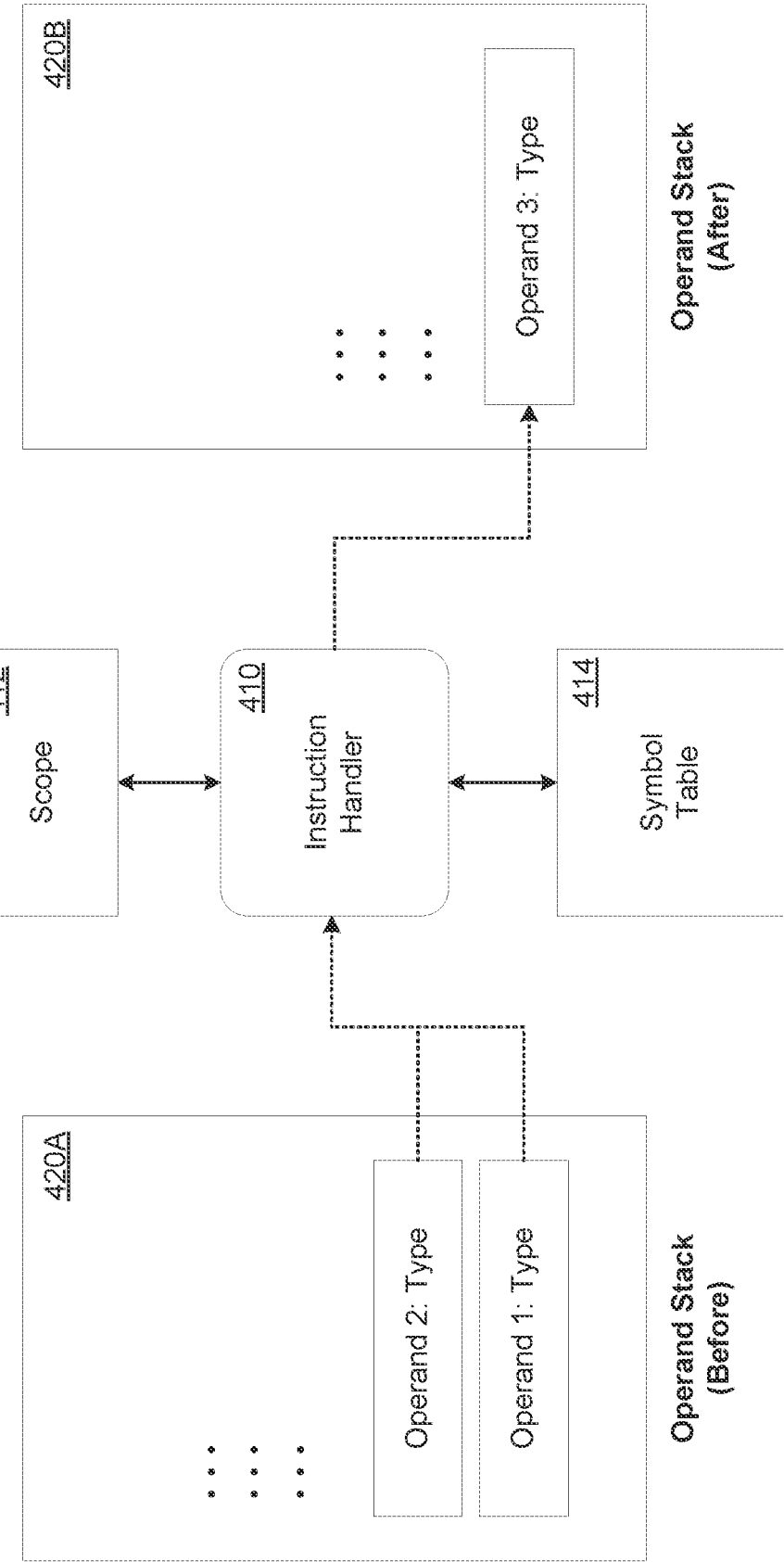
FIGS. 4A-4C are diagrams illustrating a process of a compiler performing syntactical and lexical analysis, in accordance with example embodiments.

FIG. 4A illustrates a virtual machine 400 that includes an instruction handler 410 for processing instructions, taking input from a before operand stack 420A and producing output on an after operand stack 420B. Here, the virtual machine 400 is the part of a compiler which is responsible for performing the actual semantic analysis. As instructions are being compiled, various checks such as syntactic checks, lexical analysis, and semantic checks may be performed on the instructions. The mechanism illustrated in this figure details parts of the proposed solution, namely the design of the virtual machine interpreting/processing the semantic bytecode. This is not a traditional way of performing semantic analysis, which happens traditionally by traversing over the AST.

Here, the virtual machine 400 may include a scope 412 associated with the source code instructions being processed which stores name bindings and information on the parts in the source code where these name bindings are valid, and a symbol table 414 that is created by the virtual machine 400 (e.g., the compiler) during compiling, and which includes symbols that have been created from the individual tokens within the source code and information relating to declaration and appearance of the symbols, as well as information on their types. The symbol table 414 may include variable names, function names, types, objects, classes, interfaces, etc. The virtual machine 400 may interact with the symbol table 414 to perform the semantic analysis of the source code.

Figure 4B:
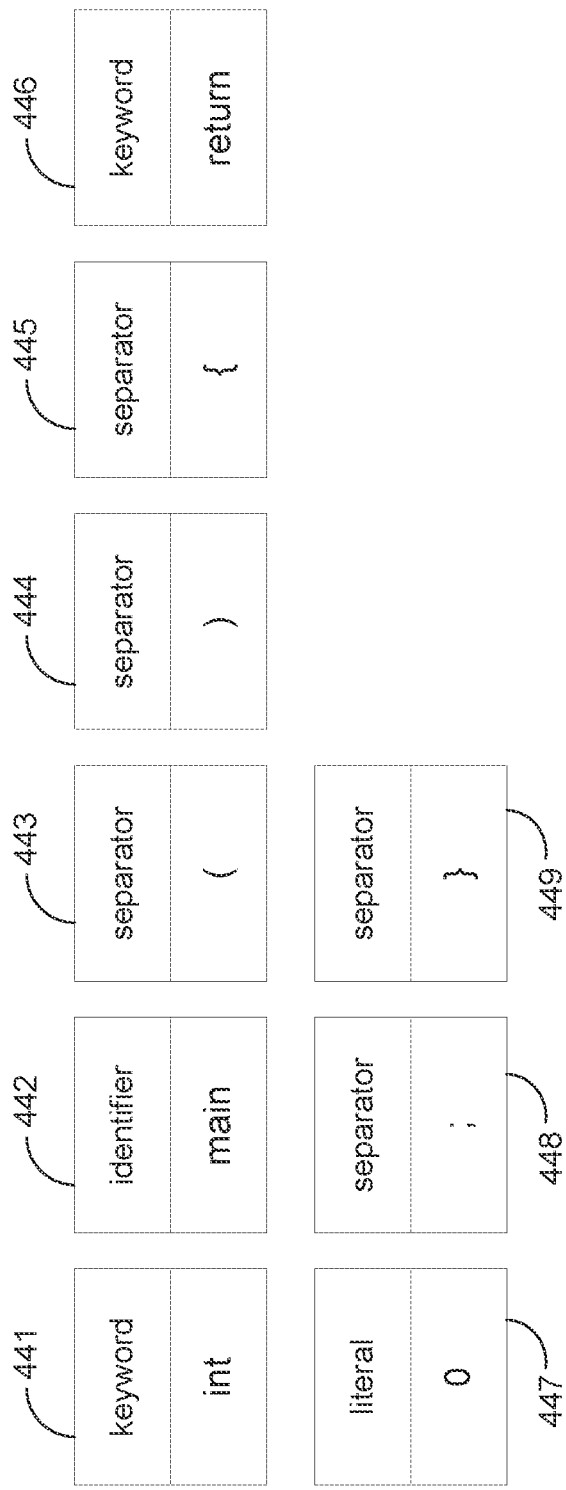

FIG. 4B illustrates a process 430 of converting a character sequence 440 from source code into tokens 441, 442, 443, 444, 445, 446, 447, 448, 449, and 450 in accordance with an example embodiment. Referring to FIG. 4B, the character sequence 440 may represent an expression from source code, or just a partial portion of an expression from the source code. Referring to FIG. 4B, the character sequence 440 may be converted into tokens 441-450 as is done in the art. Here, the compiler may split the character sequence 440 into individual pieces and store the individual pieces within the tokens 441-450 which each include a different data value from the character sequence 440 and an identifier of a type of the data value. The tokens 441-450 are easier for the compiler to process rather than a single string value with all of the individual characters stored therein as is the case in the character sequence 440.

Figure 4C:
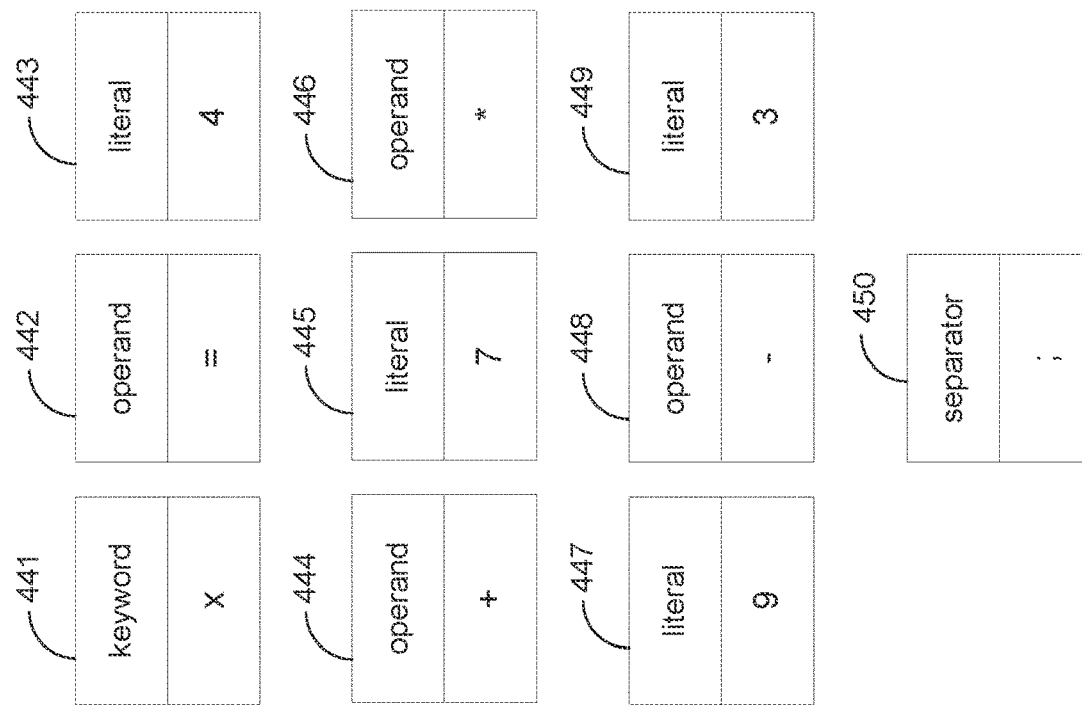

FIG. 4C illustrates a process 460 of building an abstract syntax tree 470 from the tokens 441-450 in FIG. 4B, in accordance with an example embodiment. The abstract syntax tree 470 includes a root node 471 and a plurality of leaf nodes 472, 473, 474, 475, and 476 that store the literals from the tokens 441-450. The abstract syntax tree 470 also includes a plurality of intermediate nodes 477, 478, and 479 which store the operands from the tokens 441-450. The abstract syntax tree 470 can be created by the compiler when performing syntactical analysis and the lexical analysis, and capable of being traversed when performing the semantic analysis.

According to various embodiments, and as further described below with respect to FIGS. 5A and 5B, the compiler described herein may generate semantic bytecode for every part of a statement, not only those statements that depend on dynamic expressions. Furthermore, the compiler may encode semantic checks (code, bytecode, etc.) for dynamically-dependent expressions of source code into the semantic bytecode of a compiled program. One of the goals of the encoding is to determine which parts of the code do not depend on dynamic expressions and which do. During compile time, the compiler may perform as many semantic checks as possible on the expressions within the source code. For any expressions that are dependent on a dynamic expression, the compiler may encode the semantic checks for such expressions within a bytecode that is then added to the compiled program code or a separate executable. This enables efficient process of all instructions that are statically defined, while waiting on all dependent instructions which rely on dynamic expressions until runtime. This delays the semantic checks on the dependent expressions with static variables until the dynamic variable in the parent expression is filled-in.

An example compilation process of a query using bytecode-based semantic analysis may include the compiler performing lexical and syntactical analysis as usual for all the static parts and clauses of the query. Meanwhile, for the semantic operations and checks, different semantic checks needed for the dependent expressions may be encoded into the compiled code and processed later during runtime. Here, for each expression (static and dependent), the compiler will generate semantic bytecode. Furthermore, for expressions that are dependent on dynamic expressions, the semantic checks to be performed are identified and converted to a bytecode representation, which is added to the semantic bytecode of all of the expressions. The semantic bytecode is interpreted during runtime/execution of the source code, effectively performing the semantic analysis during runtime. All operations that depend on runtime information (directly or indirectly) and thus cannot be performed at compile time are collected. Here, the compiler may perform as much semantic checks as possible at compile time. The resulting semantic bytecode that cannot yet be executed at compile time is stored along with the other compilation results Meanwhile, during subsequent execution of the query at runtime, the dynamic clauses can be interpreted. In this case, the lexical and syntactical analysis is performed for the actual runtime values of the dynamic clauses of the query. Furthermore, the semantic operations and checks for each dynamic clause are collected and converted to semantic bytecode. Furthermore, the semantic bytecode for the dynamic clauses is combined with the parts of the semantic bytecode depending on dynamic clauses within the source code.

Semantic analysis is typically performed by traversing the abstract syntax tree (AST) representation of a program and executing checks for every node in the tree. This approach makes it hard to determine which checks can already be performed at compile time and makes selecting only the necessary checks to perform at runtime a costly operation. In contrast, in the bytecode-based semantic analysis, semantic checks may be encoded into a form that makes it easier to reason about runtime dependency, the so-called semantic bytecode.

Checks that are not dependent on runtime information can subsequently be executed at compile time, while those checks that do depend on runtime information are collected and persisted alongside other compilation results. Thus, a first subset of instructions can have a semantic analysis performed at compile time, while a second subset of instructions can have a semantic analysis that is performed at runtime. Here, the first and second subsets may include mutually exclusive instructions sets or partially overlapping instructions sets. When executing the query at runtime, the dynamic clauses are interpreted and processed in the same way as the static ones at compile time. The resulting semantic bytecode for the dynamic clauses is combined with the collected runtime-dependent semantic bytecode and interpreted. Furthermore, because a single query can be executed multiple times, the runtime portion of the semantic analysis may have to be repeated depending on if the concrete form of a dynamic clause changed or not.

Traditionally, semantic analysis is performed by traversing an abstract syntax tree that is created during the lexical and syntactical analysis phases of the compiler. The information is stored in a symbol table (or other data structure). The goal is to check semantic correctness of the program and prepare necessary information for the next compiler phase (i.e., code generation). Ideally, the semantic analysis may be completed during the compile phase. However, this process can be frustrated when the source code includes dynamic expressions/clauses with unknown variables that are filled-in at runtime. For these instructions, and the static instructions that depend on the dynamic expressions, the semantic analysis must be performed at runtime of the program, after compile time. The current state of the art performs the semantic analysis of the dynamic expressions (and their dependent expressions) during runtime using an abstract syntax tree. However, traversing a tree at runtime can create significant delays for larger programs.

The example embodiments identify, at compile time, which parts of a program are static and not dependent on dynamic expressions, and which parts of the program are dynamic and depend on dynamic expressions. The entire program is transformed into semantic bytecode by the compiler. Furthermore, for dynamic expressions and the static expressions that depend from the dynamic expressions, semantic checks can be encoded into the semantic bytecode. At runtime, the compiler may interpret all of the instructions within the semantic bytecode. For the dynamic expressions, and the static expressions that depend therefrom, the compiler may execute the semantic checks encoded within the semantic bytecode without having to traverse an abstract syntax tree as is the case in a traditional state of the art compiler. As a result, the amount of time for performing the semantic checks during runtime can be simplified and performed much more efficiently.

According to various embodiments, at compile time, the compiler may generate semantic bytecode for an entire SQL statement and encode semantic checks to be performed during runtime into a compiled representation (semantic bytecode) of the SQL statement created during compile time. That is, semantic bytecode is generated for the whole statement. All static parts (e.g., the compiler does not know if they depend on dynamic information) may be converted into semantic bytecode as well as all dynamic clause placeholders. The semantic bytecode may be processed using symbolic execution (e.g., best effort or "see how far the compiler can get"). Instructions that do not depend on dynamic clauses can be fully processed at compile time. Furthermore, if a statement is fully static, the entire semantic bytecode can already be processed at compile-time and there is no need to store additional compilation results, and runtime does not have to do anything special. However, for instructions that depend on dynamic clauses in some way, semantic bytecode that could not be processed is persisted alongside other compilation results. These are the semantic checks for the static parts that depend on dynamic clauses, as well as for the dynamic clause placeholders. In this case, the semantic bytecode may be generated by traversing the abstract syntax tree similar to a traditional compiler. However, at runtime, the tree does not need to be accessed/traversed. Instead, at runtime, semantic bytecode is generated for the concrete values of the dynamic clauses only and then combined with the semantic bytecode from the compilation result. The resulting semantic bytecode is then processed. This is the actual semantic analysis for the dynamic clauses and everything that depends on the dynamic clauses.

As further described below in the examples of FIGS. 5A-5D, an INCLUDE instruction may be used to introduce uncertainty, etc., into compiled bytecode. When encountering an INCLUDE instruction at compile-time in the semantic bytecode (introduced by a dynamic clause in the statement), the compiler may not be able to make any assertions on the exact result of the bytecode instructions following it. Accordingly, the results of such instructions become uncertain. For example, given a dynamic from clause, the compiler cannot check at compile-time if a certain column exists in any table or what its type is, as the compiler does not have the necessary information yet. This uncertainty spreads throughout the execution of the semantic bytecode, as semantic bytecode instructions that rely on the type of columns to be know now also cannot be processed at compile-time, and so on.

Some clauses introduce more uncertainty than others. From clauses typically introduce a significant amount of uncertainty, because the compiler cannot lookup columns and their types. Meanwhile, a select list typically introduces very little uncertainty. The semantic bytecode interpreter described herein can deal with uncertainty. Instructions where the exact result cannot be computed at compile-time simply yield a special value. For example, querying the type of a column in the presence of a dynamic from clause may yield the "UNKNOWN_TYPE" or the like. Instructions that are fed such unknown values as input also yield unknown results. The uncertainty spreads to semantic checks depending on dynamic clauses (directly or indirectly). This is a very simplified form of symbolic execution. At runtime, everything should have been resolved, so no symbolic execution or uncertainty is necessary.

Figure 5A:
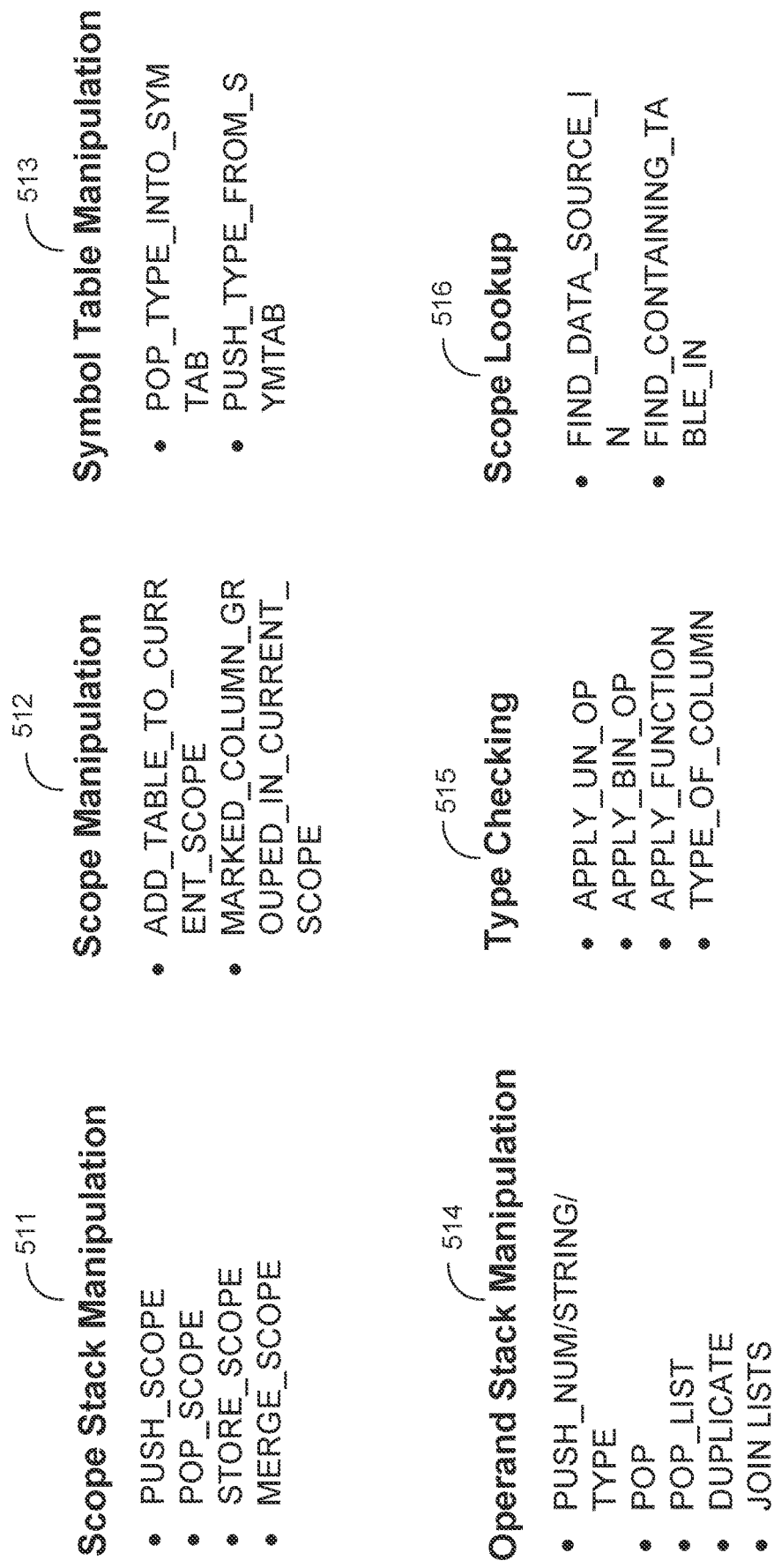
FIG. 5A is a diagram illustrating examples of semantic instructions that can be encoded by a compiler, in accordance with example embodiments.
Figure 5C:
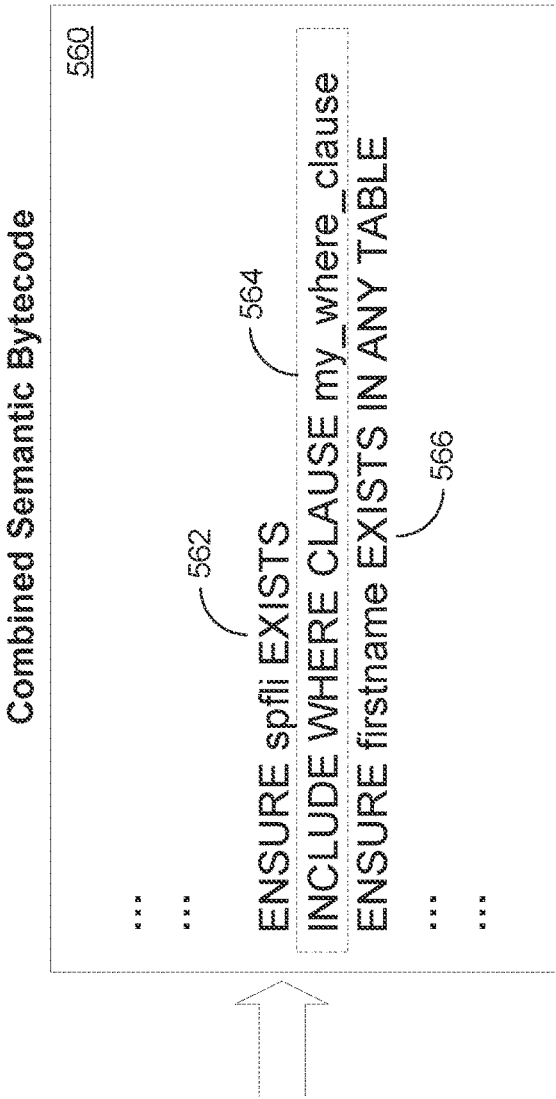

FIG. 5A illustrates a semantic instruction set 500 that includes examples of semantic instructions that can be encoded into bytecode and added to a compiled program in accordance with example embodiments, and FIGS. 5B-5D illustrate processes of encoding bytecode into compiled code in accordance with example embodiments. Referring to FIG. 5A, the compiler may store the semantic instruction set 500 within a memory of the compiler that includes a list of possible semantic checks that can be performed. In this example, the instruction set 500 includes various types of checks 511, 512, 513, 514, 515, and 516. Not all checks will be applicable to each expression. Here, the compiler may identify which checks are to be performed based on the type of expression. In response, the compiler may select a subset of semantic code from the instruction set 500 and encode it as bytecode into a compiled-representation of the program.

FIG. 5B illustrates a process 501 of transforming source code 530 into semantic bytecode 540. Referring to FIG. 5B, a compiler may convert the source code 530 into the semantic bytecode 540 that includes source code that is compiled into semantic bytecode for all expressions with semantic checks encoded therein for dynamic expressions and static expressions that are dependent on dynamic expressions. In the example of FIG. 5B, source code 530 includes a SQL query with source code instructions 532, 534, and 536. Here, the source code instruction 532 is a dynamic clause because the variable "my_select_list" is unknown at compile time and only becomes known at runtime. The source code instructions 534 and 536 are statically-defined instructions with variables known at compile time which do not depend from the dynamic clause in the source code instruction 532. Therefore, the source code instructions 534 and 536 can be checked semantically at compile time.

The compiler may generate the semantic bytecode 540 that includes instructions 542, 544, 546, and 548 representing the different semantic checks. In particular, instruction 542 is a semantic check of source code instruction 534, instructions 544 and 546 are semantic checks of source code instruction 536, and instruction 548 is a semantic check of source code instructions 532. It should be appreciated the instructions 542-548 are written abstractly for ease of understanding, but may include actual code in implementation. In this case, instructions 542, 544, and 546 can be performed at compile time. Meanwhile, the remaining semantic check included in instruction 548 may be held over and performed at runtime. In this case, the compiler includes the term "INCLUDE" in the instruction 548 to indicate uncertainty of the clause at compile time and the need for the semantic check at runtime.

FIG. 5C illustrates a process 502 of a compiler converting a source code 550 into semantic bytecode 560 according to another example. In the example of FIG. 5C, the source code 550 includes a SQL query with source code instructions 552, 554, and 556. Here, the source code instruction 556 is a dynamic clause because the variable "my_where_clause" is unknown at compile time and only becomes known at runtime. Meanwhile, the source code instructions 552 and 554 are statically-defined instructions with variables known at compile time which do not depend from the dependent clause included in the source code instruction 556, and therefore the source code instructions 552 and 554 can be checked semantically at compile time. The semantic bytecode 560 includes instructions 562, 564, 566, representing the different semantic checks. In this case, the compiler includes the term "INCLUDE" in the instruction 564 to indicate uncertainty of the dynamic where clause at compile time. The instructions 562 and 566 can be executed at compile time even though the instruction 566 is located after the INCLUDE in the instruction 564 in the semantic bytecode 560. This is due to the fact that the uncertainty introduced by the dynamic where clause does not affect the selected list (firstname). However, the instruction 564 (and the corresponding semantic check) is held over until runtime.

FIG. 5D illustrates a process 503 of a compiler converting a source code 570 into semantic bytecode 580 according to another example. In the example of FIG. 5D, the source code 570 includes a SQL query with source code instructions 572, 574, and 576. Here, the source code instruction 574 includes a dynamic clause because the variable "my_from_clause" is unknown at compile time and only becomes known at runtime. Meanwhile, the source code instructions 572 and 574 are statically-defined instructions with variables known at compile time. In this case, the source code instruction 576 is not dependent on the dynamic clause in the source code instruction 574, however, the source code instruction 572 is dependent on the dynamic clause in the source code instruction 574. In this case, the source code instruction 576 can be checked semantically at runtime, however the source code instructions 572 and 574 cannot.

In this example, the compiler generates the semantic bytecode 580 which includes instructions 582, 584, 586, and 588, representing the different semantic checks. In this case, the compiler includes the term "INCLUDE" in the instruction 582 to indicate uncertainty of the dynamic from clause at compile time. In this case, the instructions 584 and 586 can be executed at compile time even though the instructions 584 and 586 are located after the INCLUDE in the instruction 582 in the semantic bytecode 560. This is due to the fact that the uncertainty introduced by the dynamic from clause does not affect the statically-defined where clause. However, instructions 582 and 588 corresponding to semantic checks of source code instructions 572 and 574 are held over and performed at runtime.

Accordingly, at compile time, the lexical and syntactic analysis is performed as usual for all the static parts and clauses of the query. However, instead of performing all of the semantic analysis directly on the resulting abstract syntax tree, the abstract syntax tree may be traversed to collect semantic checks to be performed for any static or dynamic expressions that depend from a dynamic expression. These collected checks are encoded in a bytecode format as described in the examples of FIGS. 5B-5D. This semantic bytecode is then interpreted, effectively carrying out the actual semantic analysis. Bytecode instructions that are dependent on runtime information by either directly or indirectly referencing dynamic clauses are identified and collected. The runtime dependent instructions form the part of the semantic analysis that cannot be carried out at compile time and are stored away with other compilation result for processing at runtime.

At runtime, the dynamic clauses of the query are evaluated and processed by the lexical analysis component and parser, resulting in an AST representation of the dynamic clauses. Analogous to the compile time, the semantic checks for the dynamic clauses are collected and encoded as semantic bytecode. This runtime semantic bytecode is then combined with runtime-dependent semantic bytecode generated at compile time. Interpreting the combined semantic bytecode concludes the semantic analysis of the query. Unlike the runtime-dependent semantic bytecode resulting from the compile time semantic analysis which does not change during the runtime, the runtime semantic bytecode may has to be re-generated in case the query is executed multiple times with varying concrete forms of its dynamic clauses.

Figure 6:
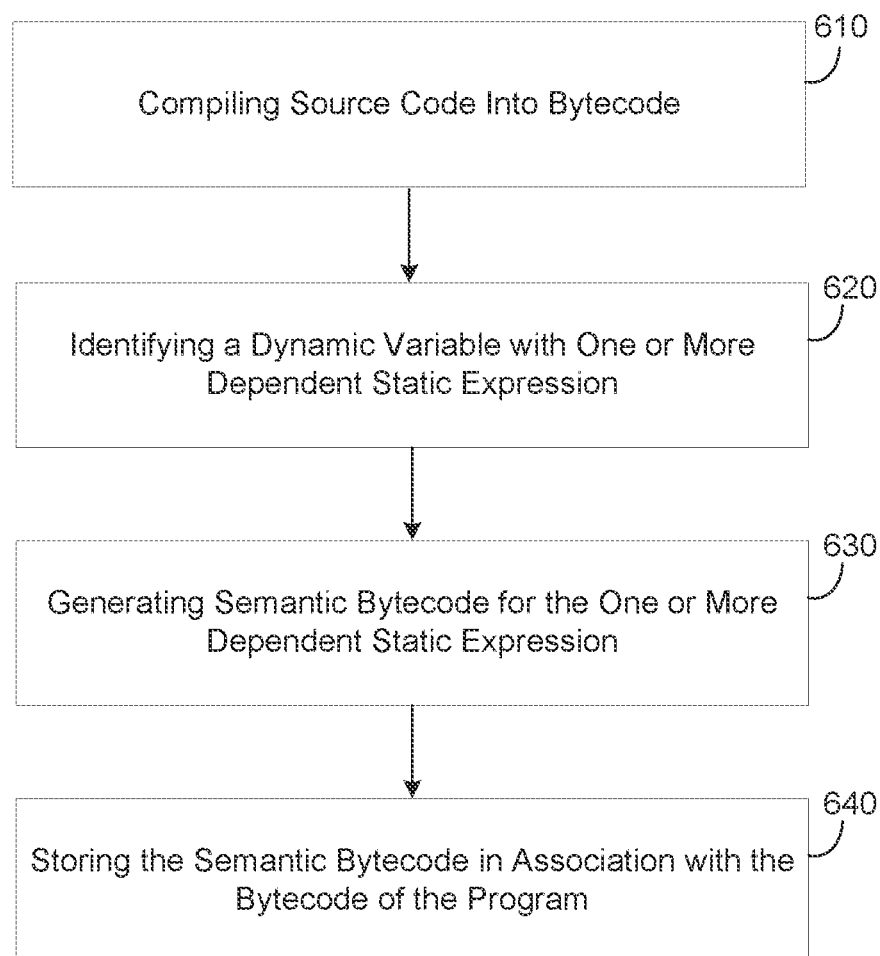
FIG. 6 is a diagram illustrating a method of generating semantic bytecode, in accordance with an example embodiment.

FIG. 6 illustrates a method 600 of generating semantic bytecode in accordance with an example embodiment. As an example, the method 600 may be performed by a database node included within a distributed database system. As another example, the method 600 may be performed by a computing device such as a server, a cloud platform, a user device, an on-premises server, and the like. In some examples, the method 600 may be performed by a plurality of devices in combination. Referring to FIG. 6, in 610, the method may include compiling source code of a program into bytecode, or some other form of intermediate code that can be executed during runtime. The source code may include query instructions such as an SQL query for querying data from a database or other data store.

In 620, the method may include identifying, during the compiling, a dynamic expression that includes one or more dependent static expressions within the source code. The dynamic expression may include a variable that is initially unknown during compile time and that is filled-in dynamically at runtime. In some embodiments, the compiler may store the types of variables (e.g., static vs. dynamic) in a file. As another example, the compiler may recognize a dummy variable or some other indicator that has been added to the syntax/source code that indicates that the variable is dynamic. Meanwhile, the one or more dependent static variables may be known variables that rely on unknown data (dynamic filled-in variable in the dynamic expression).

In 630, the method may include generating semantic bytecode for semantic analysis of the one or more dependent static expressions of the dynamic expressions. For example, the generating may include identifying one or more semantic variable checks to perform from the source code, and then retrieving the bytecode for such checks from an instruction set. Here, the bytecode may be pre-designed code or template with blanks or dummy variables for the dynamic aspects that can be filled-in at runtime with corresponding variable names, etc. In 640, the method may include storing the semantic bytecode in association with the bytecode of the program. As an example, the semantic bytecode may be encoded within a file (e.g., an executable file, etc.) that includes the compiled source code output by the compiler. As another example, the semantic bytecode may be encoded into a separate executable file that can be executed or added to a program via an additional step.

In some embodiments, the compiling may include building an abstract syntax tree based on a sequence of instructions within the source code, wherein the generating comprises generating the semantic bytecode based on variables of the program stored within the abstract syntax tree. In some embodiments, the method may further include executing an executable that includes the bytecode of the program with the semantic bytecode inserted therein to perform semantic analysis checks on the one or more dependent static variables. In some embodiments, the compiling may include performing semantic analysis on other variables within the source code which do not depend on dynamic expressions.

In some embodiments, the compiling may include generating a symbol table based on instructions within the source code, and the method further comprises storing the semantic bytecode within the symbol table. In some embodiments, the source code may include a structured query language (SQL) command, and the dynamically filled-in variable is in a FROM statement within the SQL command from which one or more WHERE statements depend. In some embodiments, the identifying may include identifying the dynamic variable from a code section within the source code that comes after an INCLUDE statement in the source code. In some embodiments, the adding may include encoding one or more of semantic bytecode for executing a type check and semantic bytecode for executing a declaration check within the bytecode of the program.

Figure 7:
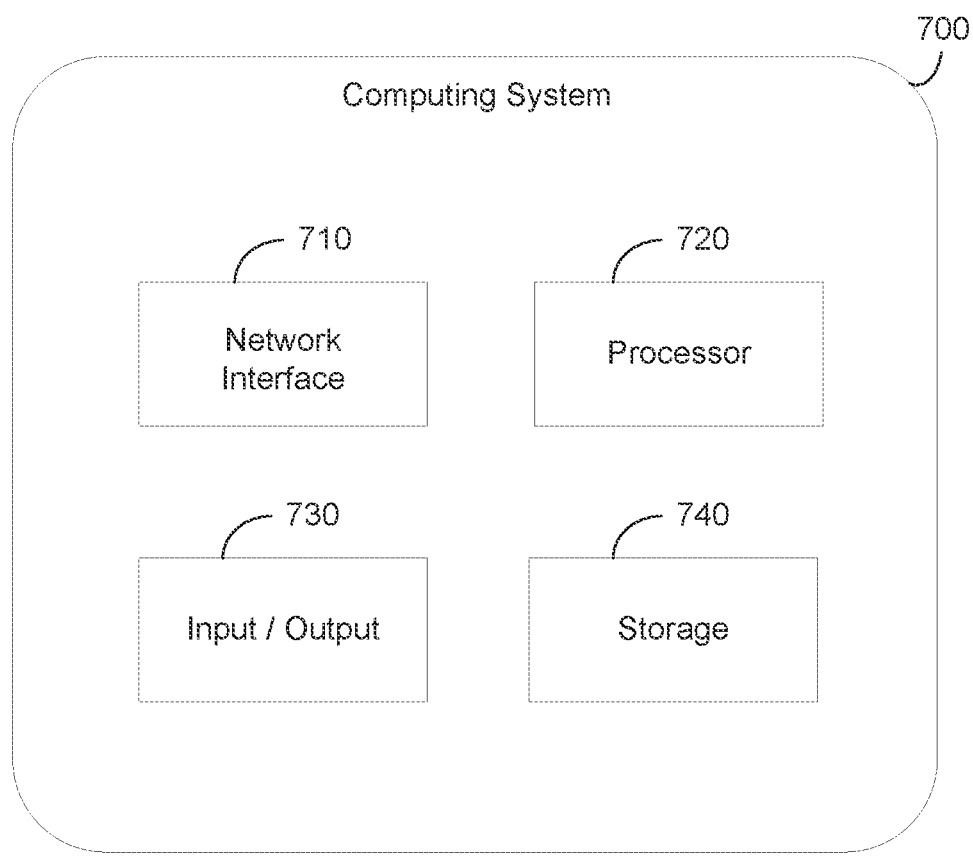
FIG. 7 is a diagram illustrating a computing system, in accordance with an example embodiment.

FIG. 7 illustrates a computing system 700, in accordance with an example embodiment. For example, the computing system 700 may be a database node, a server, a cloud platform, a user device, or the like. In some embodiments, the computing system 700 may be distributed across multiple devices. Referring to FIG. 7, the computing system 700 includes a network interface 710, a processor 720, an output 730, and a storage 740 such as an in-memory. Although not shown in FIG. 7, the computing system 700 may also include or be electronically connected to other components such as a display, an input unit, a receiver, a transmitter, a persistent disk, and the like. The processor 720 may control the other components of the computing system 700. For example, the processor 720 may implement or execute a compiler that performs the processes described herein.

The network interface 710 may transmit and receive data over a network such as the Internet, a private network, a public network, an enterprise network, and the like. The network interface 710 may be a wireless interface, a wired interface, or a combination thereof. The processor 720 may include one or more processing devices each including one or more processing cores. In some examples, the processor 720 is a multicore processor or a plurality of multicore processors. Also, the processor 720 may be fixed or it may be reconfigurable. The output 730 may output data to an embedded display of the computing system 700, an externally connected display, a display connected to the cloud, another device, and the like. For example, the output 730 may include a port, an interface, a cable, a wire, a board, and/or the like, with input/output capabilities. The network interface 710, the output 730, or a combination thereof, may interact with applications executing on other devices. The storage 740 is not limited to a particular storage device and may include any known memory device such as RAM, ROM, hard disk, and the like, and may or may not be included within the cloud environment. The storage 740 may store software modules or other instructions which can be executed by the processor 720 to perform the method 600 shown in FIG. 6.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
   a memory configured to store source code of a program; and
   a processor configured to
      compile the source code of the program into bytecode,
      identify, during the compiling, a dynamic expression that includes one or more dependent static expressions within the source code,
      generate semantic bytecode for semantic analysis of the one or more dependent static expressions of the dynamic expression, and
      store the semantic bytecode in association with the bytecode of the program.

2. The computing system of claim 1, wherein the processor is further configured to build an abstract syntax tree based on a sequence of instructions within the source code, and generate the semantic bytecode based on variables and operators of the program stored within the abstract syntax tree.

3. The computing system of claim 1, wherein the processor is further configured to execute an executable that includes the bytecode of the program with the semantic bytecode encoded therein to perform semantic analysis checks on the one or more dependent static expressions.

4. The computing system of claim 1, wherein the processor is configured to perform semantic analysis on other expressions within the source code which do not depend on dynamic expressions.

5. The computing system of claim 1, wherein the processor is configured to generate a symbol table based on instructions within the source code, and store the semantic bytecode within the symbol table.

6. The computing system of claim 1, wherein the source code comprises a structured query language (SQL) command, and the dynamic expression is a FROM statement within the SQL command from which one or more WHERE statements depend.

7. The computing system of claim 1, wherein the processor is configured to identify the dynamic expression from a code section within the source code that comes after an INCLUDE statement in the source code.

8. The computing system of claim 1, wherein the processor is configured to encode one or more of semantic bytecode for executing a type check and semantic bytecode for executing a declaration check within the bytecode of the program.

9. A method comprising:
   compiling source code of a program into bytecode;
   identifying, during the compiling, a dynamic expression that includes one or more dependent static expressions within the source code;

generating semantic bytecode for semantic analysis of the one or more dependent static expressions of the dynamic expression; and storing the semantic bytecode in association with the bytecode of the program.

10. The method of claim 9, wherein the compiling comprises building an abstract syntax tree based on a sequence of instructions within the source code, wherein the generating comprises generating the semantic bytecode based on expressions of the program stored within the abstract syntax tree.

11. The method of claim 9, wherein the method further comprises executing an executable that includes the bytecode of the program with the semantic bytecode inserted therein to perform semantic analysis checks on the one or more dependent static expressions.

12. The method of claim 9, wherein the compiling comprises performing semantic analysis on other expressions within the source code which do not depend on dynamic expressions.

13. The method of claim 9, wherein the compiling comprises generating a symbol table based on instructions within the source code, and the method further comprises storing the semantic bytecode within the symbol table.

14. The method of claim 9, wherein the source code comprises a structured query language (SQL) command, and the dynamic expression is a FROM statement within the SQL command from which one or more WHERE statements depend.

15. The method of claim 9, wherein the identifying comprises identifying the dynamic expression from a code section within the source code that comes after an INCLUDE statement in the source code.

16. The method of claim 9, wherein the storing comprises encoding one or more of semantic bytecode for executing a type check and semantic bytecode for executing a declaration check within the bytecode of the program.

17. A method comprising:
detecting a static expression within source code of a query that is dependent on a dynamic expression within the query;
compiling the source code of the query into intermediate code;
generating semantic code for semantic analysis of the static expression within the source code based on a filled-in value for the dynamic expression during runtime; and
storing the semantic code within an executable file associated with the intermediate code.

18. The method of claim 17, wherein the compiling comprises building an abstract syntax tree based on the source code of the query, and the generating comprises generating the semantic code based on the abstract syntax tree.

19. The method of claim 17, wherein the method further comprises executing the executable file which performs semantic analysis checks on the static expression during runtime.

20. The method of claim 17, wherein the compiling comprises performing semantic analysis on as many other expressions within the source code which are not dynamic or dependent on a dynamic expression.

\* \* \* \* \*